United States Patent
McLean et al.

(10) Patent No.: US 10,909,098 B2
(45) Date of Patent: Feb. 2, 2021

(54) SETTING A FLAG TO INDICATE THAT A USER INTERFACE HAS STALE DATA WITHIN A SUBJECT MATTER CATEGORY

(71) Applicant: Lenovo Enterprise Solutions (Singapore) Pte. Ltd., Singapore (SG)

(72) Inventors: James Gordon McLean, Raleigh, NC (US); Jimmie Lee Brundidge, Raleigh, NC (US); John Joseph Hedderman, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 103 days.

(21) Appl. No.: 16/456,237

(22) Filed: Jun. 28, 2019

(65) Prior Publication Data
US 2020/0409917 A1    Dec. 31, 2020

(51) Int. Cl.
  *G06F 3/048* (2013.01)
  *G06F 16/21* (2019.01)
  *G06F 16/23* (2019.01)
  *G06F 16/25* (2019.01)
  *G06F 16/215* (2019.01)

(52) U.S. Cl.
  CPC .......... *G06F 16/217* (2019.01); *G06F 16/215* (2019.01); *G06F 16/2379* (2019.01); *G06F 16/252* (2019.01)

(58) Field of Classification Search
  None
  See application file for complete search history.

(56) References Cited

U.S. PATENT DOCUMENTS

2004/0123239 A1* 6/2004 Roessler ............... G06F 16/957
                                                    715/744

* cited by examiner

*Primary Examiner* — William C Trapanese
(74) *Attorney, Agent, or Firm* — Jeffrey Streets

(57) ABSTRACT

A computer program product provides program instructions configured to be executable by a processor to cause the processor to perform operations. The operations include associating, for each data field among a plurality of data fields of a database, the data field with a subject matter category from among a plurality of subject matter categories; providing data from the database to a first user interface; detecting data entry into a first data field of the database subsequent to providing data from the database to the first user interface; identifying a first subject matter category that is associated with the first data field into which the detected data entry is received; and setting a first flag to indicate that the first user interface has stale data within the first subject matter category without immediately pushing data reflecting the detected data entry to the first user interface.

20 Claims, 5 Drawing Sheets

60A

Flag State Table
[0 = current; 1 = stale]

| Subject Matter Categories | User A | User B | User C |
|---|---|---|---|
| Category 1 (Inventory) | 0 | 0 | 0 |
| Category 2 (Power State) | 0 | 0 | 0 |
| Category 3 (Error/Message State) | 0 | 0 | 0 |
| Category 4 (Management State) | 0 | 0 | 0 |

Example: Current data provided to each User
All flags reset to 0

60A →

Flag State Table
[0 = current; 1 = stale]

| Subject Matter Categories | User A | User B | User C |
|---|---|---|---|
| Category 1 (Inventory) | 0 | 0 | 0 |
| Category 2 (Power State) | 0 | 0 | 0 |
| Category 3 (Error/Message State) | 0 | 0 | 0 |
| Category 4 (Management State) | 0 | 0 | 0 |

Example: Current data provided to each User
 All flags reset to 0

Flag State Table
[0 = current; 1 = stale]

| Subject Matter Categories | User A | User B | User C |
|---|---|---|---|
| Category 1 (Inventory) | 0 | 0 | 0 |
| Category 2 (Power State) | 0 | 1 | 1 |
| Category 3 (Error/Message State) | 0 | 0 | 0 |
| Category 4 (Management State) | 0 | 0 | 0 |

Example: User A makes a change to a parameter in the power state category
 Power State data is immediately updated to User A
 Users B, C power state flags set to 1

Flag State Table
[0 = current; 1 = stale]

| Subject Matter Categories | User A | User B | User C |
|---|---|---|---|
| Category 1 (Inventory) | 0 | 0 | 0 |
| Category 2 (Power State) | 0 | 0 | 1 |
| Category 3 (Error/Message State) | 0 | 0 | 0 |
| Category 4 (Management State) | 0 | 0 | 0 |

Example: User B accesses page with power state data
 User B receives updated power state data
 User B power state Flag reset to 0

*FIG. 4C*

SETTING A FLAG TO INDICATE THAT A USER INTERFACE HAS STALE DATA WITHIN A SUBJECT MATTER CATEGORY

BACKGROUND

The present disclosure relates to a database providing data to a user interface in an efficient manner.

BACKGROUND OF THE RELATED ART

Certain applications, such as a Systems Management Software, may provide a user interface with data that is changing rapidly or frequently. The data may be collected and stored in a central database, but must be transferred to each user interface that is accessing the data. Many such applications may provide multiple users with access to the data and/or may receive data from multiple users and/or multiple other sources. Furthermore, the range of data may include numerous variables, datapoints, parameters, and other content. Accordingly, transferring data between the database and the user interfaces may consume substantial resources of the database host, as well as each client user interface and network nodes between the database host and the client user interfaces.

Some applications attempt to push the most current data to each user interface at all times despite the substantial drain on resources and any corresponding decline in performance. This may be a satisfactory approach where the number of user interfaces is small or where the data set is small or seldom changes. In these situations, it may be relatively easy for the application and system resources to provide each user interface with the most current information by sending updated information as soon as any changes in the data occur.

In some applications, it may be critical for a user interface to have current data. For example, where a user may make changes to the data or take actions affecting the operation of the system from the user interface, the user may need the most current data in order to make a decision about what changes or actions are appropriate. Inaccurate or stale data may result in the user taking an inappropriate action. While the user may manually refresh the user interface for the purpose of obtaining the most current data, this places an additional responsibility on the user.

BRIEF SUMMARY

Some embodiments provide a computer program product comprising a non-volatile computer readable medium and non-transitory program instructions embodied therein, the program instructions being configured to be executable by a processor to cause the processor to perform operations. The operations may comprise associating, for each data field among a plurality of data fields of a database, the data field with a subject matter category from among a plurality of subject matter categories. The operations may further comprise providing data from the database to a plurality of user interfaces, detecting data entry into a first data field among the plurality of data fields of the database subsequent to providing data from the database to the plurality of user interfaces, identifying a first subject matter category that is associated with the first data field into which the detected data entry is received, and setting and storing a first flag to indicate that at least one user interface among the plurality of user interfaces has stale data within the first subject matter category without immediately pushing data reflecting the detected data entry to the first user interface. The operations further comprise determining that the first user interface is currently using data within the first subject matter category, providing, in response to determining that the first user interface is currently using data within the first subject matter category, the first user interface with current data within the first subject matter category, and resetting the first flag to indicate that the first user interface has current data within the first subject matter category.

Some embodiments provide a computer program product comprising a non-volatile computer readable medium and non-transitory program instructions embodied therein, the program instructions being configured to be executable by a processor to cause the processor to perform operations. The operations comprise associating, for each data field among a plurality of data fields of a database, the data field with a subject matter category from among a plurality of subject matter categories. The operations further comprise providing data from the database to a first user interface, detecting data entry into a first data field among the plurality of data fields of the database subsequent to providing data from the database to the first user interface, identifying a first subject matter category that is associated with the first data field into which the detected data entry is received, and setting a first flag to indicate that the first user interface has stale data within the first subject matter category without immediately pushing data reflecting the detected data entry to the first user interface, wherein setting the first flag to indicate that the user interface has stale data within the first subject matter category, includes sending a notice to the user interface that the user interface has stale data within the first subject matter category. The operations further comprise receiving a message from the first user interface requesting current data within the first subject matter category, and providing, in response to receiving the message, the first user interface with current data within the first subject matter category.

Some embodiments provide a computer program product comprising a non-volatile computer readable medium and non-transitory program instructions embodied therein, the program instructions being configured to be executable by a processor to cause the processor to perform operations. The operations may comprise associating, for each data field among a plurality of data fields of a database, the data field with a subject matter category from among a plurality of subject matter categories. The operations may further comprise providing data from the database to a plurality of user interfaces, detecting data entry into a first data field among the plurality of data fields of the database subsequent to providing data from the database to the plurality of user interfaces, identifying a first subject matter category that is associated with the first data field into which the detected data entry is received, and setting a first flag to indicate that at least one user interface among the plurality of user interfaces has stale data within the first subject matter category without immediately pushing data reflecting the detected data entry to the first user interface. The operations further comprise determining that a first user interface among the at least one user interface that has stale data within the first subject matter category is currently using data within the first subject matter category, providing, in response to determining that the first user interface is currently using data within the first subject matter category, the first user interface with current data within the first subject matter category, and resetting the first flag to indicate that the first user interface has current data within the first subject matter category.

BRIEF DESCRIPTION OF THE SEVERAL VIEWS OF THE DRAWINGS

FIGS. 4A-C include a sequence of flag state tables, illustrating flag state changes during certain operations of the database application.

DETAILED DESCRIPTION

Figure 1:
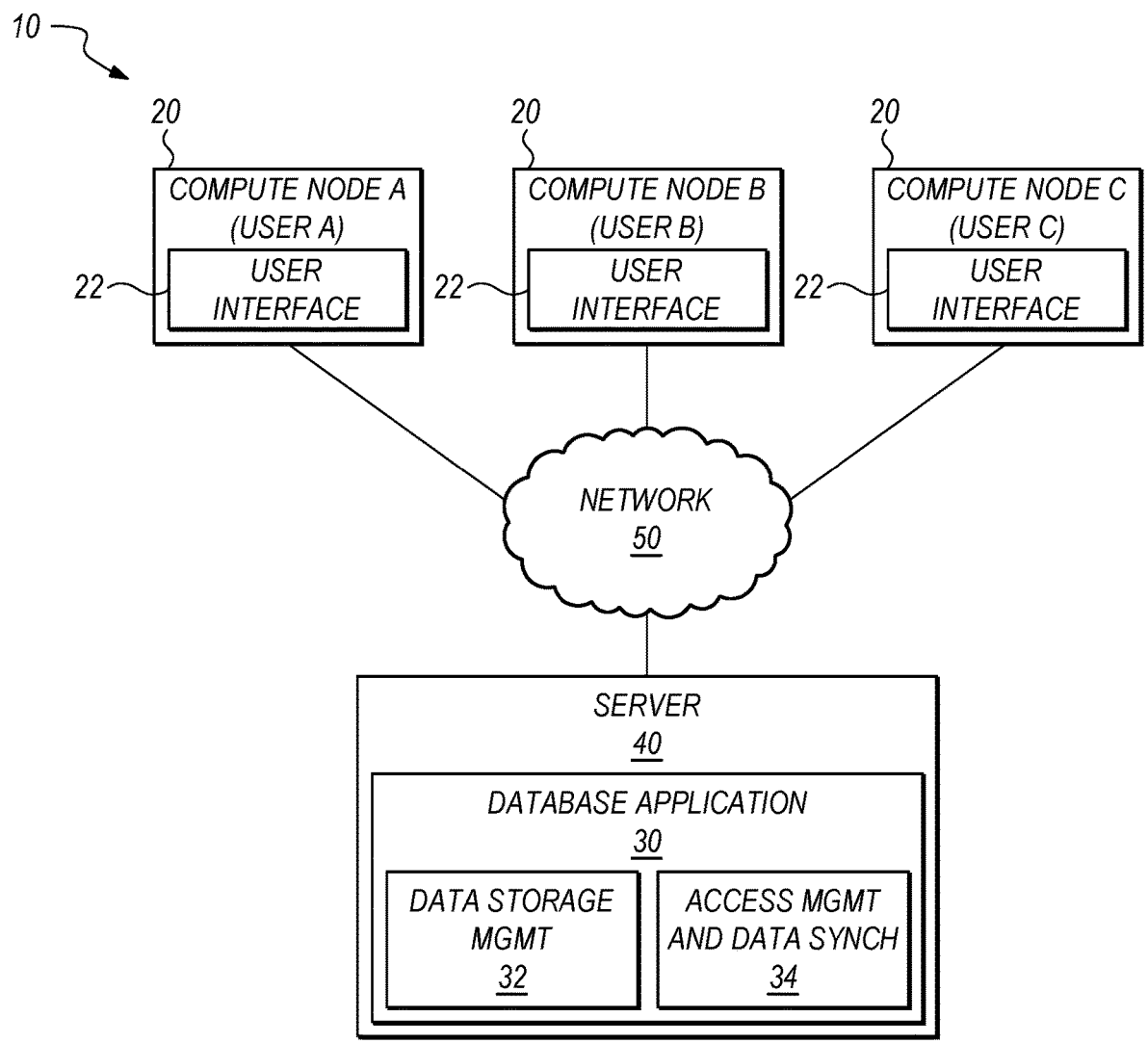
FIG. 1 is a diagram of a system including a plurality of compute nodes that can access a database application on a server.

Some embodiments provide a computer program product comprising a non-volatile computer readable medium and non-transitory program instructions embodied therein, the program instructions being configured to be executable by a processor to cause the processor to perform operations. The operations may comprise associating, for each data field among a plurality of data fields of a database, the data field with a subject matter category from among a plurality of subject matter categories. The operations may further comprise providing data from the database to a plurality of user interfaces, detecting data entry into a first data field among the plurality of data fields of the database subsequent to providing data from the database to the plurality of user interfaces, identifying a first subject matter category that is associated with the first data field into which the detected data entry is received, and setting and storing a first flag to indicate that at least one user interface among the plurality of user interfaces has stale data within the first subject matter category without immediately pushing data reflecting the detected data entry to the first user interface. The operations further comprise determining that the first user interface is currently using data within the first subject matter category, providing, in response to determining that the first user interface is currently using data within the first subject matter category, the first user interface with current data within the first subject matter category, and resetting the first flag to indicate that the first user interface has current data within the first subject matter category.

Some embodiments provide a computer program product comprising a non-volatile computer readable medium and non-transitory program instructions embodied therein, the program instructions being configured to be executable by a processor to cause the processor to perform operations. The operations comprise associating, for each data field among a plurality of data fields of a database, the data field with a subject matter category from among a plurality of subject matter categories. The operations further comprise providing data from the database to a first user interface, detecting data entry into a first data field among the plurality of data fields of the database subsequent to providing data from the database to the first user interface, identifying a first subject matter category that is associated with the first data field into which the detected data entry is received, and setting a first flag to indicate that the first user interface has stale data within the first subject matter category without immediately pushing data reflecting the detected data entry to the first user interface, wherein setting the first flag to indicate that the user interface has stale data within the first subject matter category, includes sending a notice to the user interface that the user interface has stale data within the first subject matter category. The operations further comprise receiving a message from the first user interface requesting current data within the first subject matter category, and providing, in response to receiving the message, the first user interface with current data within the first subject matter category.

The database may be any data structure that includes an organized collection of data. The database may be stored and accessed electronically on a computer system that is connected to a network accessible to multiple users. The database and database application may include a software program that runs directly on a server or cloud, or may include a software program that runs on a Virtual Machine (VM) that is hosted on a server, cloud or any other VM-capable host. Furthermore, the database and database application may be included in a software appliance along with just enough operating system (JeOS).

A user interface may include graphical, voice, or other type of interface that communicates with the database application. Each of a plurality of users may establish a user session with the database application, such that each user session may generate a separate user interface. Embodiments of the database application may support multiple concurrent users of the same instance of the database application. A user session may be run on a physical system, such as a laptop computer or thin client, or a virtual system, such as a Virtual Machine (VM) running on a server or cloud. A user may also access a cloud-based instance of the database application via a web connection.

Embodiments of the database are not limited to any particular programming language, data structure or content. As used herein, the term "data field" or "parameter" are used in their generic sense to describe content of a particular type. For example, a database that stores a hardware inventory for a computer system might include a "data field" or "parameter" for each of the hardware component type, manufacturer, and model number. More of fewer data fields or parameters may be included as established by a database programmer or administrator. In another example, a database may collect operating data for a power supply, where the data fields may include an amount of output power, output voltage, output current, operating temperature, and power management mode. It should be appreciated that a database may include a wide variety of data from a wide variety of sources. Specifically, data may be collected and entered into the database from a user or administrator via manual input and/or from a component or system via automated data collection.

The plurality of subject matter categories may be specific to a particular database and may be established by a user or system administrator. For example, certain systems management software may include a database application maintaining a database that reflects the management and operation of a computer system, such that data may cover the subject matter categories of hardware inventory, power state, error/message state and management state. Each subject matter category may be associated with any number of data fields or parameters, such as by storing a group of records where each record identifies both a subject matter category and one or more data field or parameter that is to be associated with the subject matter category. Furthermore, the subject matter categories may be broad categories or narrow categories, and may be selected to reflect the configuration of a user interface or common tasks that a user may perform via the user interface. In one option, a user interface may be a web page that provides access to the database, where the user may select from among a plurality of web pages that each facilitate a task or group of tasks. For example, a user interface may display a page that includes operating data for a particular server within a computer system as well as management control actions that the user may initiate with respect to the same server. Other pages may be made available that focus on other components of a computer system or other management control actions. The data that is displayed on each page may be provided from the database to a user interface over a network, such as a local area network (LAN) and/or a wide area network (WAN) such as the Internet.

A database application may detect data entry into a first data field among the plurality of data fields of the database subsequent to providing data from the database to the first user interface. The data entry may be detected upon receipt at a network port or upon executing a write command to store the received data into the database. Other points in the handling of the data may also be used to detect data entry. Furthermore, some data entry may be detected in a first manner while other data entry may be detected in a second manner. For example, data entry from a user interface may be received over a network and the data entry may be accompanied by metadata identifying the data as representing a value of a particular data field or parameter. Alternatively, data entry from a component or sensor may be identified by a particular identifier or port, or by a wired/wireless connection between the component or sensor and the server or other compute node that is running the database application.

Some embodiments may use a lookup table or other data structure to associate each data field or parameter with a subject matter category. For example, the associations may be established by a user, system administrator or database application programmer during setup or programming. Optionally, the associations between data fields and subject matter categories may be established with knowledge of how users may interact with the database and how the user interface is to be used. For example, individual parameters or data fields that are related to a given object or task may be included in a single subject matter category. Accordingly, when a user desires to obtain information about a particular object or perform a particular task, the user may open a particular page for display on the user interface. If the page includes data fields or parameters within a single subject matter category, then the user only needs current data within that single subject matter category. While a page may include data fields or parameters from any select number of subject matter categories, providing current data for those select few subject matter categories may require less data transfer to the user interface than providing a full-refresh of the database or keeping every data field or parameter current at all times. More specifically, the use of subject matter categories enables the database application to reduce the volume of data transfers to one or more user interface by providing each active user interface with current data only within the subject matter category that is being utilized. If a given user interface is actively using data within a first subject matter category, the data fields or parameters in a second subject matter category may be frequently changing without causing the database application to immediately provide the given user interface with current data within the second subject matter category.

Embodiments may use a flag to indicate that a certain user interface has stale data within the first subject matter category without immediately pushing data reflecting the detected data entry to the first user interface. In one example, a flag may have a value of "0" to indicate that a given user interface has no stale data within a given subject matter category and a value of "1" to indicate that the given user interface has stale data within the given subject matter category. For each user interface, there may be a flag for each subject matter category. In other words, if there are three user interfaces and four subject matter categories, then there may be twelve flags. The flags may be stored in a flag table, bit field or set of bit fields. In embodiments where the database application maintains the flags, the value of each of the flags may be store in a single flag table. However, in embodiments that send the flag to the user interface having the stale data, each user interface may maintain its own flag table or bit field. It should be recognized that a flag used to indicate stale data may be synonymous with a flag used to indicate current data, since the data is either current or stale. Accordingly, a 'stale data" flag having a first value, say "0", to indicate that certain data is not stale is the equivalent of a "current data" flag having a second value, say "1", to indicate that certain data is current. Either example of a flag indicates whether or not the data is stale and simultaneously indicates whether or not the data is current.

In some embodiments, the operation of setting the first flag to indicate that the user interface has stale data within the first subject matter category, may include sending a notice to the user interface that the user interface has stale data within the first subject matter category. As a result, the user interface receiving the notice is then responsible for requesting current data when needed. For example, if a user causes the user interface to load particular data, such as data that is included on a particular web page to be displayed on the user interface, then the user interface may send a message to the database application requesting current data within the subject matter category identified in the notice. The database application may then receive the message from the user interface requesting current data within the first subject matter category that has been indicated as being stale, and provide, in response to receiving the message, the user interface with current data within the first subject matter category. In another example, if a user instructs the user interface to perform an action on the database or a physical system represented by the data in the database, then the user interface may send a message to the database application requesting current data within the subject matter category identified in the notice. It is not necessary that the current data be displayed or otherwise output to a user, but rather the current data may be needed by the user interface to verify preconditions of the action being taken. In a specific situation, a user interface may request current data in the power state subject matter category in order to verify that a given component or system is powered on before enabling the user to take action to initiate a firmware update of that component or system. In this situation, it is not necessary for the user interface to notify the user that the target component or system is powered on, but is sufficient for the user interface to have current information indicating that the target component or system is powered on.

In some embodiments, the operation of setting the first flag to indicate that the user interface has stale data within the first subject matter category, may include storing the flag in memory accessible to a host program, such as a database application, that operates the database. For example, the flag may be stored in a flag table or other data structure. The operations may further include determining that the first user interface is currently using data within the first subject matter category, and providing, in response to determining that the first user interface is currently using data within the first subject matter category, the first user interface with current data within the first subject matter category. Optionally, the user interface may be programmed to always report what data the user interface is using, such that the database application can determine what data the user interface is using by reading what is reported by the user interface. After providing the current data within the first subject matter category to the user interface, the database application may reset the first flag to indicate that the first user interface has current data (i.e., does not have stale data) within the first subject matter category. A user interface may be using data within a given subject matter category when the user interface is currently rendering a page that includes data within the given subject matter category and/or when the user interface is taking an action that is dependent upon a state represented by data within the subject matter category. In either of these two situations (i.e., display and/or taking action), the user interface needs current data within the given subject matter category.

Some embodiments may send a prompt to the user interface requesting user input to indicate whether or not to update the user interface with data reflecting the detected data entry. Such a prompt may be sent at any time following detection of the data entry. For example, the prompt may be sent to the user interface in response to detecting that the user interface is being used to perform a management control function on a system that is a source of the data that includes the stale data. Specifically, if a user interface is being used to power down a component of a computer system, then the user interface should have current data regarding the component to be powered down. Therefore, upon detecting that the user interface is being used to initiate a power down function, a prompt may be sent to the user interface to query whether the user would like current data before implementing the power down function. While the current data in the relevant subject matter category could simply be sent upon detecting selection of a power down function, the amount of data in some situations may be large and it may be desirable to prompt the user for an instruction. However, allowing the user to decide whether or not to receive updated data prior to taking an action may be enabled, for example, only in situations where the consequences of making assumptions based on stale data would be limited.

Some embodiments address the occurrence of detecting further data entry, meaning that data entry is detected after having already detected some data entry subsequent to providing data to a user interface. In other words, the further data entry may be the second or later instance of data entry after providing data to the user interface. If the further data entry is directed to a second data field among the plurality of data fields of the database subsequent to setting the first flag, the database application may identify a second subject matter category that is associated with the second data field into which the detected further data entry is received. The manner in which the database application deals with the further data entry may depend upon whether the identified second subject matter category is the same as, or different than, the first subject matter category. If the identified second subject matter category is different than the first subject matter category, then a second flag may be set to indicate that the first user interface has stale data within the identified second subject matter category without immediately pushing data reflecting the detected further data entry to the first user interface. Conversely, if the identified second subject matter category is the same as the first subject matter category and if a flag has already been set to indicate that the first user interface has stale data within the first subject matter category, then no flag is set and no data reflecting the detected data entry is immediately pushed to the first user interface. In this later situation, no flag is set because the relevant flag is already set for the first user interface and the first subject matter category. The flag indicates that the first user interface has stale data in the first subject matter category, and it does not change the situation for the first user interface to have additional stale data with the first subject matter category.

Some embodiments may provide for a periodic update of all data at one or more user interface, or a periodic update of data that is sufficient to clear one or more of the stale data flags. For example, a periodic operation may include identifying a flag that has been set to indicate that a given user interface among a plurality of user interfaces has stale data within a given subject matter category among the plurality of subject matter categories, pushing an update of all data within the given subject matter category to the given user interface, and resetting the identified flag to indicate that the given user interface does not have stale data within the given subject matter category. One option may perform the foregoing periodic operations at times when the database application, network, or user interface has available capacity such that the operations do not reduce performance. Furthermore, the periodic operations may be selectively performed for one or more of the user interfaces and/or for one or more of the subject matter categories. This includes the possibility of periodically updating the data for all subject matter categories to all user interfaces, which may be referred to as a full-refresh, such that all stale data flags would be reset. Still further, a periodic update could be handled on a user-by-user basis, such as with long-polling, so that any one or more of the user interfaces may submit a general request to the database application for an update of any data that may be stale. While the user interface does not expect an immediate reply from the database application, the long-polling request is eventually satisfied when the user interface receives some updated data from the database application. A periodic update could also be handled on a category-by-category basis, by refreshing the data within a subject matter category to all user interfaces. Such a category-by-category update may be useful where data within a given category is particularly important or has experienced particularly important change in the data.

Some embodiments may be configured to immediately push data to a user interface when the data entry has been received from that user interface. In this manner, a user may immediately see the data entries that they have made or the results of the actions they have taken. For example, the database application may provide data from the database to a second user interface and subsequently push, in response to the detected data entry being received from the second user interface, data reflecting the detected data entry to the second user interface.

Some embodiments provide a computer program product comprising a non-volatile computer readable medium and non-transitory program instructions embodied therein, the program instructions being configured to be executable by a processor to cause the processor to perform operations. The operations may comprise associating, for each data field among a plurality of data fields of a database, the data field with a subject matter category from among a plurality of subject matter categories. The operations may further comprise providing data from the database to a plurality of user interfaces, detecting data entry into a first data field among the plurality of data fields of the database subsequent to providing data from the database to the plurality of user interfaces, identifying a first subject matter category that is associated with the first data field into which the detected data entry is received, and setting a first flag to indicate that at least one user interface among the plurality of user interfaces has stale data within the first subject matter category without immediately pushing data reflecting the detected data entry to the first user interface. The operations further comprise determining that a first user interface among the at least one user interface that has stale data within the first subject matter category is currently using data within the first subject matter category, providing, in response to determining that the first user interface is currently using data within the first subject matter category, the first user interface with current data within the first subject matter category, and resetting the first flag to indicate that the first user interface has current data within the first subject matter category.

Embodiments that have been described in reference to a first user interface may still be compatible with multiple user interfaces. However, embodiments may still prove to be beneficial during times when only one user interface is having an active user session with the database application. Accordingly, the embodiments may involve multiple user interfaces, but the embodiments may still be used by a single user interface at times. Embodiments may often be used by multiple user interfaces since the embodiments may reduce the load on the database, the network and/or the user interfaces, which load may be especially high when there are multiple active user sessions interacting with the database application at the same time.

While some embodiments may expressly involve multiple user interfaces (i.e., a first user interface and a second user interface), it should be understood that features and operations described in reference to a first user interface may be employed along with a second user interface or any number of user interfaces. In other words, a discussion that only expressly references a first user interface is not limited to a single user interface.

Some embodiments may provide a computer program product comprising a non-volatile computer readable medium and non-transitory program instructions embodied therein, the program instructions being configured to be executable by a processor to cause the processor to perform operations associated with a user interface. The operations may comprise receiving data from the database, receiving a notification (flag) indicating that the user interface has stale data within a particular subject matter category identified in the notification, requesting that the database provide current data within the identified subject matter category in response to the user interface using data within the identified subject matter category, and receiving the current data within the identified subject matter category. The operations may further comprise deleting the notification or resetting a flag in response to receiving the current data.

Some embodiments may include an apparatus comprising at least one non-volatile storage device storing program instructions and at least one processor configured to process the program instructions, wherein the program instructions are configured to, when processed by the at least one processor, cause the apparatus to perform certain operations. The program instructions may be any of the program instructions described herein, and the operations may be any of the operations described herein.

FIG. 1 is a diagram of a system 10 including a plurality of compute nodes 20 that can access a database application 30 on a server 40. The compute nodes 20 are able to access the server 40 via a network 50, which may include a local area network and/or a wide area network such as the Internet. The database application 30 may include program instructions governing various database operations, including data storage management 32 and access management and data synchronization 34. The operations of data storage management 32 may include receiving and storing data as well as providing data to one or more user interface. The operations of access management and data synchronization 34 may include authenticating user sessions via the user interfaces 22, monitoring access by each user interface, and ensuring data synchronization between the database application 30 and each user interface 22 that is supporting an active user session. Data synchronization may include assuring that the data provided to each user interface supporting an active user session is either current or noted as being stale. A flag may be set to indicate that a particular user interface has stale data within a particular subject matter category.

Figure 2:
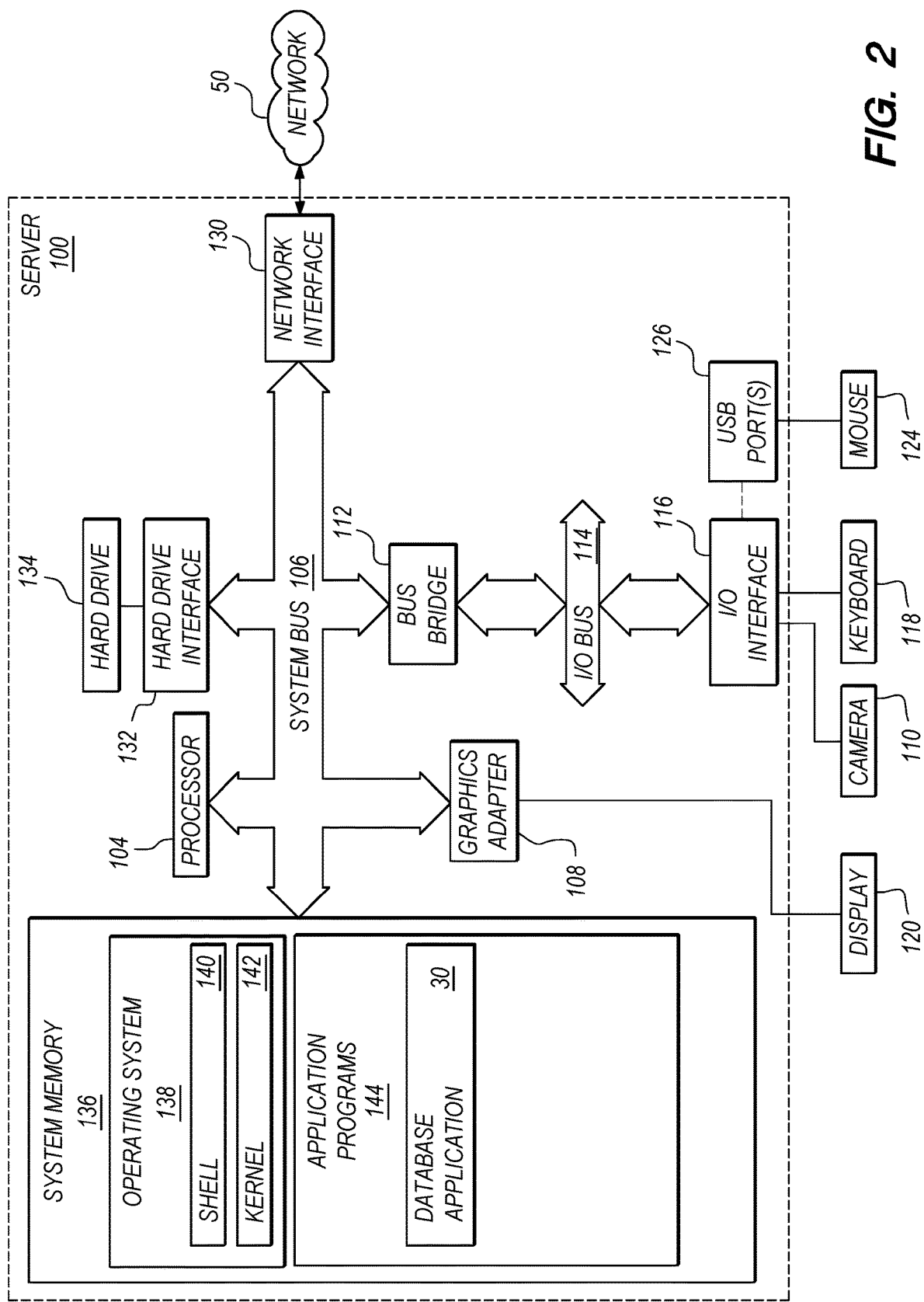
FIG. 2 is a diagram of a server.

FIG. 2 is a diagram of a server 100 that may, without limitation, be representative of the configuration of the server 40 of FIG. 1. Furthermore, the architecture of the server 100 may, without limitation, also be representative of a compute node 20. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the server 100 is able to communicate with other network devices over the network 50 using a network adapter or network interface controller 130. For example, the server 100 may communicate with compute nodes 20 in the system 10 of FIG. 1.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include an application program that is a database application including program instructions that cause the processor 104 to perform various operations.

The hardware elements depicted in the server 100 are not intended to be exhaustive, but rather are representative. For instance, the server 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 includes application programs 144 in the system memory of the server 100, including, without limitation, a database application 30.

Figure 3:
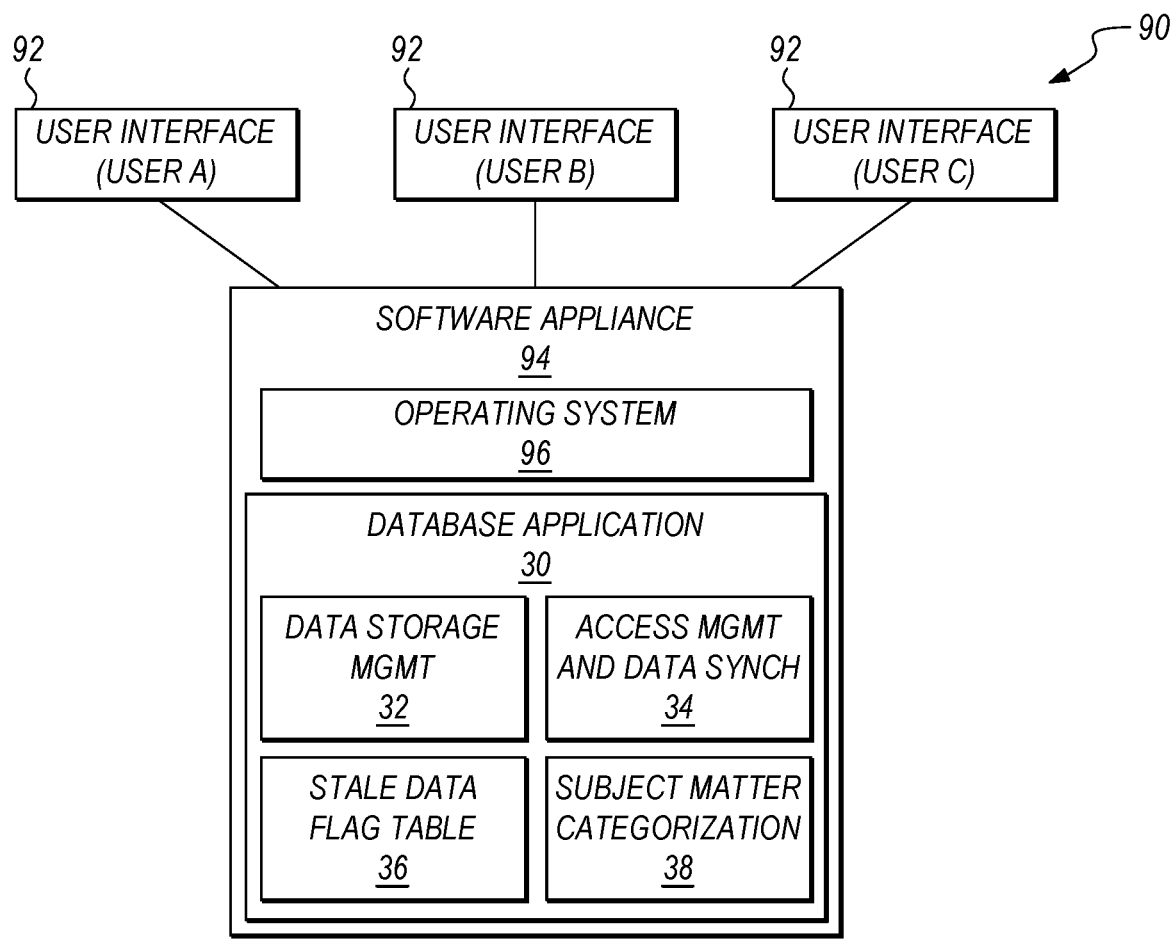
FIG. 3 is a diagram of a system including a software appliance interacting with multiple user sessions.

FIG. 3 is a diagram of a system 90 including a software appliance 94 interacting with multiple user interfaces 92. The software appliance 94 may run on a Virtual Machine (VM) that is hosted on a server, cloud or any other VM-capable host. In this example, the software appliance 94 includes an operating system 96, such as just enough operating system (JeOS), and the database application 30. In this example, the database application 30 includes program instructions governing various database operations, including data storage management 32, access management and data synchronization 34, a stale data flag table 36, and subject matter categorization 38. The operations of data storage management 32 may include receiving and storing data as well as providing data to one or more user interface. The operations of access management and data synchronization 34 may include authenticating user sessions via the user interfaces 92, monitoring access by each user interface, and ensuring data synchronization between the database application 30 and each user interface 92 that is supporting an active user session. Data synchronization may include assuring that the data provided to each user interface supporting an active user session is either current or noted as being stale in the stale data flag table 36. A flag may be set to indicate that a particular user interface has stale data within a particular subject matter category, where data may be categorized using the subject matter categorization 38. The user interfaces 92 may include graphical, voice, or other type of interface that communicates with the software appliance 94. Each of a plurality of users (i.e., User A, User B, User C and/or other users) may establish a user session with the database application 30, such that each user session may generate a separate one of the user interfaces 92. Embodiments of the database application may support multiple concurrent users of the same instance of the database application 30. Each user session may be run on a physical system, such as a laptop computer or thin client, or a virtual system, such as a Virtual Machine (VM) running on a server or cloud. A user may also access a cloud-based instance of the database application via a web connection.

FIGS. 4A-C include a sequence of flag state tables illustrating flag state changes during certain operations of the database application. A flag may be stored in any suitable data structure, but is illustrated here as a table. In this example, a flag may have one of two possible flag states at any point in time. For purposes of this example, a flag state of "0" indicates that data is current and a flag state of "1" indicates that data is stale.

In the example shown in FIGS. 4A-C, the data in the database may be divided into four subject matter categories (categories 1-4), including inventory, power state, error/message state, and management state. While the database application may host any number of users, this example discusses three users (User A, User B and User C) consistent with the diagram on FIG. 1. The flag state table 60A may be maintained by the access management and data synchronization 34 of the data application 30 to keep track of which of the user interfaces has stale data in one or more subject matter category. The flag state table 60A may have any data structure, but the illustrated flag state table includes a row for each of the four subject matter categories and a column for each of the three users. Accordingly, the flag state table 60A has twelve (12) flags or bits. In embodiments that send the flags to the user interface, a given user interface may store its own stale data flags. In this example, each user interface (User A, User B and User C) may have four flags or bits, each flag or bit corresponding to one of the four subject matter categories.

In FIG. 4A, User A, User B and User C are simultaneously accessing the database application through independent web sessions. In this initial state, the flag state table 60A shows that all three users have fully current data (all flags have a value of "0"). This is represented by each flag state being "0" to indicate that the data is current for each user interface in each subject matter category.

FIG. 4B illustrates the flag state table 60B after User A has performed a power state operation to shut down a particular server and the data reflecting the new power state is immediately provided to user A's session on the user interface of compute node A. The database application has set a stale data flag (a value of "1") for the power state category for User B and User C to indicate that the most current data within the power state category has not been provided to User B and User C. For example, User B and User C may each be accessing inventory or other information not having to do with power states and so no power state data has been sent to their user interfaces.

FIG. 4C illustrates the flag state table 60C after User B causes his user interface to load a page or panel that enables a firmware update. In order to load the relevant page, the user interface requests the database application send the page data to the user interface. The database application may be programmed with a dependency between a firmware update and power states, such that the database application requires that User B's user interface have current power state data before accepting a firmware update control function from User B. Therefore, the database application checks the flag state table to determine whether User B has current or stale data in the power state subject matter category. If User B's power state data is stale (per flag state table 60B), then the database application will push current power state data to User B's user interface before the requested page data loads and reset User B's power state flag (value of "0") as shown in flag state table 60C. This assures that user B sees current power state data before taking any action dependent upon power state data. Furthermore, the use of the flag state table minimizes the amount of bandwidth utilized, since current power state data is only sent in response to User B's activity requiring current power state data. Still further, current power state data may still not be sent to User C unless User C is also logged on and actively using power state data. Accordingly, the flag state table 60C shows that User C's power state flag is still set (value of "1) to indicate that User C's power state data is stale.

Note that in a time period between setting a stale flag (for a given user and given subject matter category) and sending current (updated) data (within the given subject matter category to the given user), any number of additional changes may have occurred within the given subject matter category which did not trigger additional data transfer. However, as soon as the given user accesses a page or function which requires current data within the given subject matter category, the database application may send the relevant data before the page is rendered by the user interface.

Figure 5:
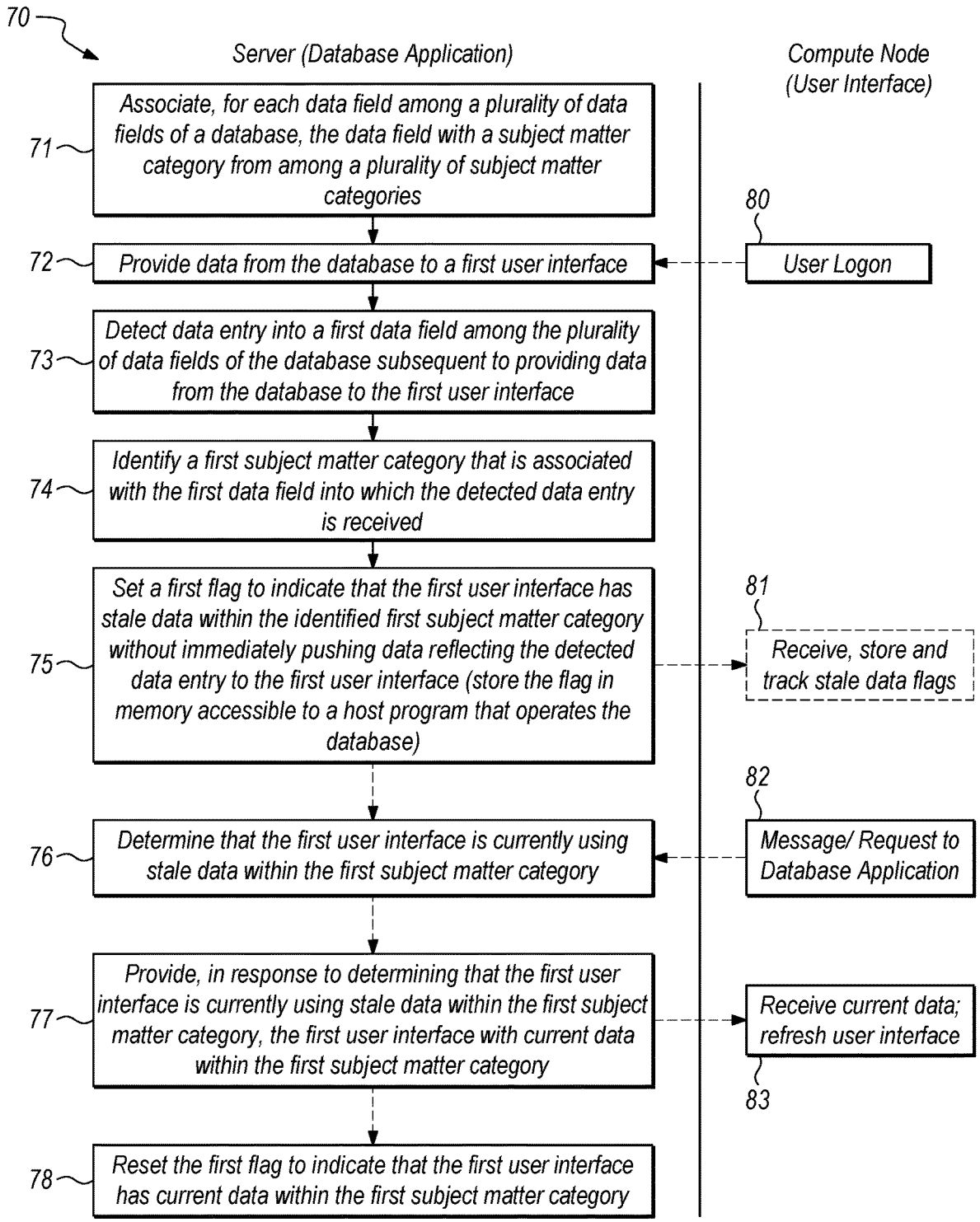
FIG. 5 is a flowchart of operations.

FIG. 5 is a flowchart of operations 70. The flowchart is divided into a left side that describes certain operations of a database application running on a server and a right side that describes certain operations of a user interface on a compute node. Some embodiments may include the operations of the database application and some embodiments may include the operations of the user interface. In addition, some embodiments may include more or fewer operations than those shown.

Operation 71 associates, for each data field among a plurality of data fields of a database, the data field with a subject matter category from among a plurality of subject matter categories. Operation 72 provides data from the database to a first user interface. For example, the database application may being a user session with the first user interface in response to receiving an authenticated user logon from the first user interface in Operation 80. Operation 73 detects data entry into a first data field among the plurality of data fields of the database subsequent to providing data from the database to the first user interface. Such data entry may come from any source, such as automated data collection or manual entry from another user interface.

Operation 74 identifies a first subject matter category that is associated with the first data field into which the detected data entry is received. A table or other data structure may include predetermined subject matter categories and one or more data field that is deemed to be associated with each subject matter category. For example, a subject matter category may be associated with the data field by virtue of being identified in a common record.

Operation 75 sets a first flag to indicate that the first user interface has stale data within the first subject matter category without immediately pushing data reflecting the detected data entry to the first user interface. In some embodiments, the first flag is set by storing the flag in memory accessible to a host program that operates the database. However, in some embodiments the database application may send the flag to the user interface, such that the user interface performs operation 81 to receive, store and track the flag along with any other stale data flags received.

Operation 76 determines that the first user interface is currently using data within the first subject matter category. This determination may include receiving a message or request that is sent by the user interface in operation 82. The message or request may merely inform the database application that the user interface is using data in a given subject matter category. In some embodiments where the flag was sent to the user interface, the user interface may send a message or request that identifies the subject matter category and informs the database that the user interface has stale data in the identified subject matter category.

In operation 77, the database application provides, in response to determining that the first user interface is currently using stale data within the first subject matter category, the first user interface with current data within the first subject matter category. Conversely, the user interface then receives the current data and refreshes the user interface in operation 83. If the database application stores the flags in a flag state table, then operation 78 resets the first flag to indicate that the first user interface has current data within the first subject matter category. In embodiments where the individual user interfaces receive and store the flags, then the user interface would reset the first flag. The responsibility for tracking flag states may be assigned to either the database application or the individual user interfaces as desired, but the assignment may depend on the relative complexity of the host database application and the user interfaces.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   associating, for each data field among a plurality of data fields of a database, the data field with a subject matter category from among a plurality of subject matter categories;
   providing data from the database to a first user interface;
   detecting data entry into a first data field among the plurality of data fields of the database subsequent to providing data from the database to the first user interface;
   identifying a first subject matter category that is associated with the first data field into which the detected data entry is received; and
   setting and storing a first flag to indicate that the first user interface has stale data within the first subject matter category without immediately pushing data reflecting the detected data entry to the first user interface;
   determining that the first user interface is currently using data within the first subject matter category;
   providing, in response to determining that the first user interface is currently using data within the first subject matter category, the first user interface with current data within the first subject matter category; and
   resetting the first flag to indicate that the first user interface has current data within the first subject matter category.

2. The computer program product of claim 1, wherein using data within the subject matter category includes currently rendering a page that includes data within the subject matter category.

3. The computer program product of claim 1, wherein using data within the subject matter category includes taking an action that is dependent upon a state represented by data within the subject matter category.

4. The computer program product of claim 1, the operations further comprising:
   detecting further data entry into a second data field among the plurality of data fields of the database subsequent to setting the first flag;
   identifying a second subject matter category that is associated with the second data field into which the detected further data entry is received; and
   setting and storing a second flag to indicate that the first user interface has stale data within the identified second subject matter category without immediately pushing data reflecting the detected further data entry to the first user interface in response to the identified second subject matter category being different than the first subject matter category.

5. The computer program product of claim 1, the operations further comprising:
   detecting further data entry into a second data field among the plurality of data fields of the database subsequent to setting the first flag;
   identifying a second subject matter category that is associated with the second data field into which the detected further data entry is received; and setting no flag without immediately pushing data reflecting the detected data entry to the first user interface in response to the identified second subject matter category being the same as the first subject matter category and already having a flag set to indicate that the first user interface has stale data within the first subject matter category.

6. The computer program product of claim 1, the operations further comprising:
identifying a flag that has been set to indicate that the first user interface has stale data within a given subject matter category among the plurality of subject matter categories;
periodically pushing an update of all data within the given subject matter category to the first user interface; and
resetting the identified flag to indicate that the first user interface does not have stale data within the given subject matter category.

7. The computer program product of claim 1, the operations further comprising:
periodically providing, for each flag set for the first user interface, an update of data within the subject matter category of the flag to the first user interface; and
resetting, for each flag set for the first user interface, the flag to indicate that the first user interface does not have stale data.

8. The computer program product of claim 1, the operations further comprising:
providing data from the database to a second user interface; and
pushing, in response to the detected data entry being received from the second user interface, data reflecting the detected data entry to the second user interface.

9. A computer program product comprising a non-volatile computer readable medium and non-transitory program instructions embodied therein, the program instructions being configured to be executable by a processor to cause the processor to perform operations comprising:
associating, for each data field among a plurality of data fields of a database, the data field with a subject matter category from among a plurality of subject matter categories;
providing data from the database to a first user interface;
detecting data entry into a first data field among the plurality of data fields of the database subsequent to providing data from the database to the first user interface;
identifying a first subject matter category that is associated with the first data field into which the detected data entry is received; and
setting a first flag to indicate that the first user interface has stale data within the first subject matter category without immediately pushing data reflecting the detected data entry to the first user interface, wherein setting the first flag to indicate that the user interface has stale data within the first subject matter category, includes sending a notice to the user interface that the user interface has stale data within the first subject matter category;
receiving a message from the first user interface requesting current data within the first subject matter category; and
providing, in response to receiving the message, the first user interface with current data within the first subject matter category.

10. The computer program product of claim 9, wherein using data within the subject matter category includes currently rendering a page that includes data within the subject matter category.

11. The computer program product of claim 9, wherein using data within the subject matter category includes taking an action that is dependent upon a state represented by data within the subject matter category.

12. The computer program product of claim 9, the operations further comprising:
detecting further data entry into a second data field among the plurality of data fields of the database subsequent to setting the first flag;
identifying a second subject matter category that is associated with the second data field into which the detected further data entry is received; and
setting a second flag to indicate that the first user interface has stale data within the identified second subject matter category without immediately pushing data reflecting the detected further data entry to the first user interface in response to the identified second subject matter category being different than the first subject matter category, wherein setting the second flag to indicate that the first user interface has stale data within the second subject matter category, includes sending a notice to the first user interface indicating that the first user interface has stale data within the second subject matter category.

13. The computer program product of claim 9, the operations further comprising:
detecting further data entry into a second data field among the plurality of data fields of the database subsequent to setting the first flag;
identifying a second subject matter category that is associated with the second data field into which the detected further data entry is received; and
setting no flag without immediately pushing data reflecting the detected data entry to the first user interface in response to the identified second subject matter category being the same as the first subject matter category and already having a flag set to indicate that the first user interface has stale data within the first subject matter category.

14. The computer program product of claim 9, the operations further comprising:
identifying a flag that has been set to indicate that the first user interface has stale data within a given subject matter category among the plurality of subject matter categories;
periodically pushing an update of all data within the given subject matter category to the first user interface; and
resetting the identified flag to indicate that the first user interface does not have stale data within the given subject matter category.

15. The computer program product of claim 9, the operations further comprising:
periodically providing, for each flag set for the first user interface, an update of data within the subject matter category of the flag to the first user interface; and
resetting, for each flag set for the first user interface, the flag to indicate that the first user interface does not have stale data.

16. The computer program product of claim 9, the operations further comprising:
providing data from the database to a second user interface; and pushing, in response to the detected data entry being received from the second user interface, data reflecting the detected data entry to the second user interface.

17. A computer program product comprising a non-volatile computer readable medium and non-transitory program instructions embodied therein, the program instructions being configured to be executable by a processor to cause the processor to perform operations comprising:

associating, for each data field among a plurality of data fields of a database, the data field with a subject matter category from among a plurality of subject matter categories;

providing data from the database to a plurality of user interfaces;

detecting data entry into a first data field among the plurality of data fields of the database subsequent to providing data from the database to the plurality of user interfaces;

identifying a first subject matter category that is associated with the first data field into which the detected data entry is received;

setting a first flag to indicate that at least one user interface among the plurality of user interfaces has stale data within the first subject matter category without immediately pushing data reflecting the detected data entry to the first user interface;

determining that a first user interface among the at least one user interface that has stale data within the first subject matter category is currently using data within the first subject matter category;

providing, in response to determining that the first user interface is currently using data within the first subject matter category, the first user interface with current data within the first subject matter category; and resetting the first flag to indicate that the first user interface has current data within the first subject matter category.

18. The computer program product of claim 17, the operations further comprising:

pushing, in response to the detected data entry being received from the second user interface, data reflecting the detected data entry to the second user interface.

19. The computer program product of claim 17, the operations further comprising:

detecting further data entry into a second data field among the plurality of data fields of the database subsequent to setting the first flag;

identifying a second subject matter category that is associated with the second data field into which the detected further data entry is received; and setting a second flag to indicate that the first user interface has stale data within the identified second subject matter category without immediately pushing data reflecting the detected further data entry to the first user interface in response to the identified second subject matter category being different than the first subject matter category.

20. The computer program product of claim 17, the operations further comprising:

detecting further data entry into a second data field among the plurality of data fields of the database subsequent to setting the first flag;

determining that the second data field into which the detected further data entry is received is associated with the first subject matter category; and setting no flag without immediately pushing data reflecting the detected data entry to the first user interface in response to already having a flag set to indicate that the first user interface has stale data within the first subject matter category.

* * * * *